United States Patent [19]

DeMars

[11] Patent Number: 4,600,113

[45] Date of Patent: Jul. 15, 1986

[54] REFUSE CONTAINER HAVING SELF-CONTAINED SCOOP AND LID

[76] Inventor: Robert A. DeMars, 7932 Maestro Ave., Canoga Park, Calif. 91304

[21] Appl. No.: 763,538

[22] Filed: Aug. 8, 1985

[51] Int. Cl.⁴ ......................... B65D 90/00; B62B 1/00

[52] U.S. Cl. .................................... 220/1 T; 220/212; 280/47.26

[58] Field of Search ............................... 220/1 T, 212; 280/47.26

[56] References Cited

U.S. PATENT DOCUMENTS

| | | | |
|---|---|---|---|
| 3,170,183 | 2/1965 | Leatherman | 220/1 T |
| 3,366,397 | 1/1968 | Zeilstra et al. | 280/47.26 |
| 3,390,804 | 7/1968 | Morgan | 220/212 |
| 4,351,539 | 9/1982 | Rodolakis | 220/1 T |

*Primary Examiner*—George T. Hall

*Attorney, Agent, or Firm*—Cislo, O'Reilly & Thomas

[57] ABSTRACT

A refuse container is disclosed, which is suitable for ease in picking up leaves or other trash. The refuse container comprises a body defined by a front wall, two sidewalls and a rear wall, an open upper end and a lower portion. The front wall forms a scoop portion at its upper end. An accommodating lid, which includes a scoop means, is further provided. Finally, an elongated pivotally disposed handle on the rear wall is provided, which is suitable for pulling the refuse container while lying on its front wall. In such prone position, leaves or other debris may be easily scooped into the refuse container either directly or by means of the scoop portion formed in the lid.

7 Claims, 6 Drawing Figures

REFUSE CONTAINER HAVING SELF-CONTAINED SCOOP AND LID

BACKGROUND OF THE INVENTION

This invention relates to refuse containers, and more particularly, to a refuse container provided with means for easily scooping up loose objects such as leaves and the like.

The problem of picking up leaves or spilled trash for disposal in a refuse container leaves much to be desired. Since the hands can only hold so much, the process is tedious and time consuming. Further, there is often the frustrating loss of material that occurs when attempting to pick up loose material, with the result that not as much material finds its way into the refuse container during a particular operation than what one starts with.

A need exists for a refuse container which permits ease of filling thereof.

OBJECTS AND SUMMARY OF THE INVENTION

Accordingly, it is an object of the present invention to provide a refuse container which permits facile filling of the container.

It is another object of the present invention to provide a refuse container adapted to lie on one side for easy filling.

It is yet another object of the present invention to provide a refuse container adapted to lie on one side which may be dragged along the ground to assist in filling the refuse container.

It is still another object of the present invention to provide a refuse container having an associated lid which may additionally be used as a scoop or shovel for pushing refuse into the refuse container.

These and further objects of the invention will become more apparent upon consideration of the following commentary taken in conjunction with the drawings.

In accordance with the invention, a refuse container is provided which comprises:

(a) a body having a front wall, two side walls and a rear wall, an open upper end and lower portion, said front wall forming a scoop portion at its upper end;

(b) an accommodating lid, including a scoop means; and (c) an elongated pivotally disposed handle on said rear wall, adapted for pulling said refuse container while lying on its front wall.

DETAILED DESCRIPTION OF THE PREFERRED EMBODIMENTS

Figure 1:
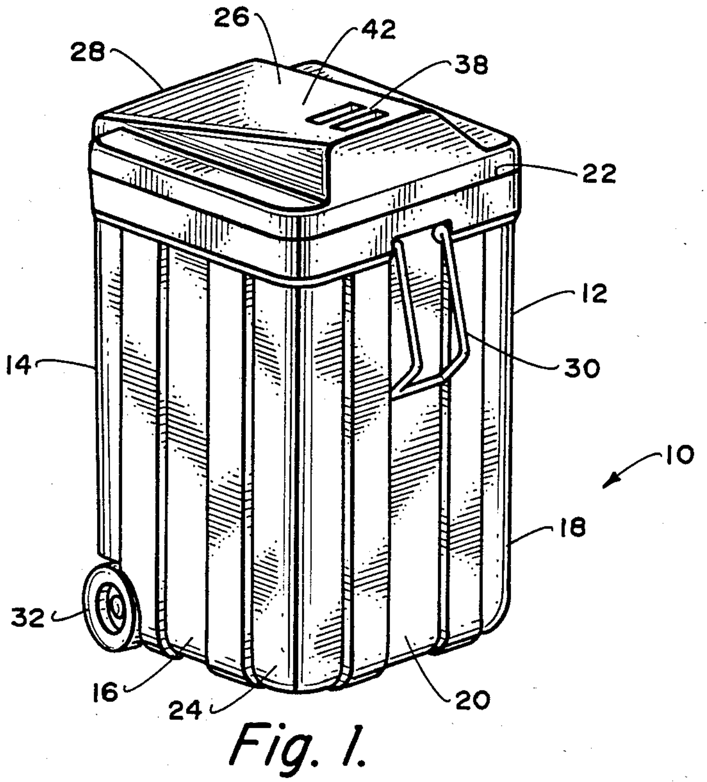
FIG. 1 is a perspective view of the refuse container of the invention.
Figure 2:
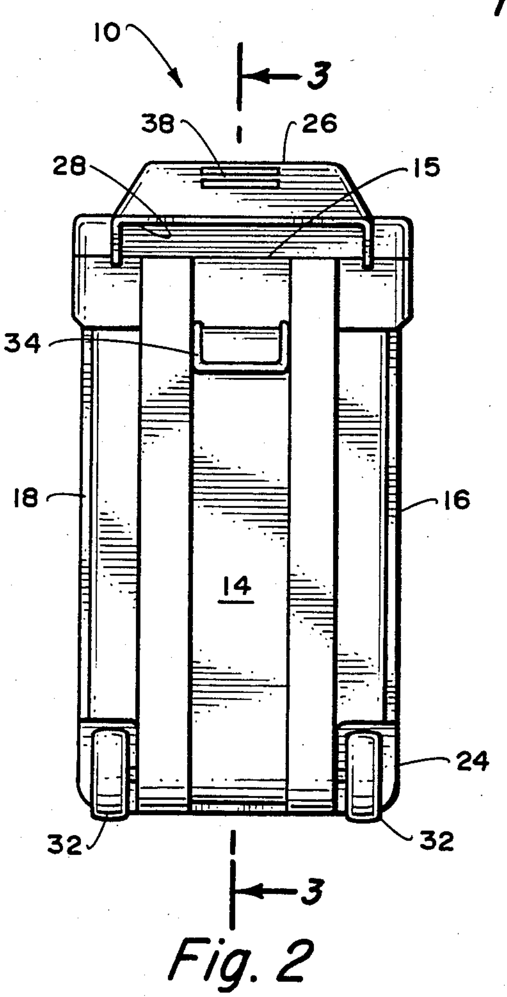
FIG. 2 is a front elevational view of the refuse container of FIG. 1.
Figure 3:
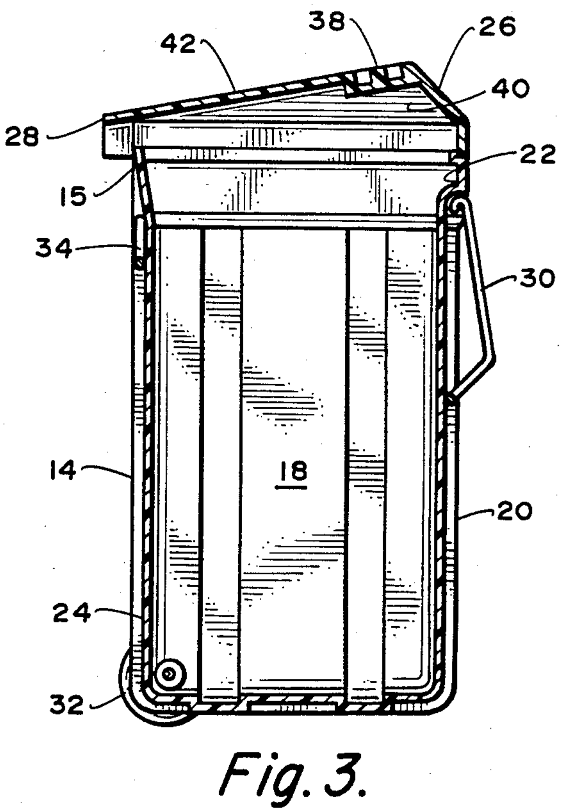
FIG. 3 is a cross-sectional view taken along the line 3—3 of FIG. 2.
Figure 4:
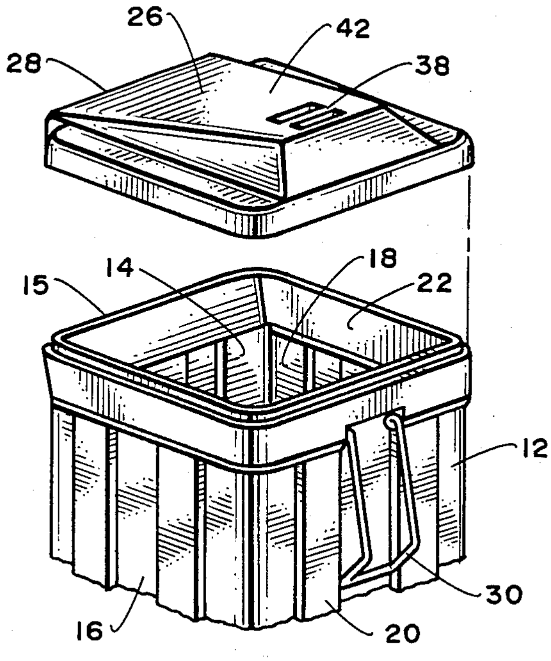
FIG. 4 is an exploded view, depicting the upper portion of the refuse container of FIG. 1, with the lid shown spaced apart from the top of the refuse container.
Figure 5:
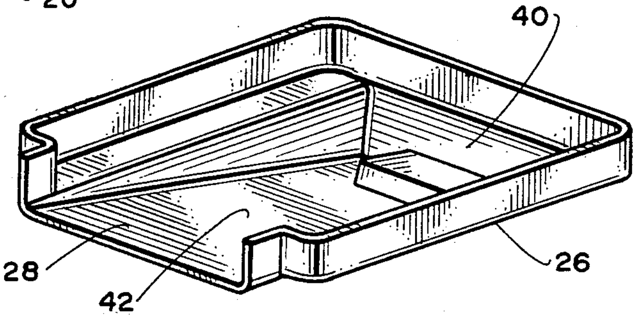
FIG. 5 is a perspective view of the inside of the lid of the refuse container.

Referring now to the drawing wherein like numerals of reference represent like elements throughout, a refuse container generally designated 10 is shown. The refuse container comprises in combination a body 12 having a front wall 14, two sidewalls 16, 18 and a rear wall 20. The body further has an open upper end 22 and a lower portion 24.

A lid 26 is accommodated to fit the open upper end 22 of the refuse container 10. The lid includes a scoop means 28.

The refuse container 10 further includes an elongated, pivotally disposed handle 30, mounted on the rear wall 20, near the upper end 22 of the refuse container 10. As will be shown below, the elongated handle is suitable for pulling the refuse container while lying on its front wall 14.

To assist in the pulling operation, the refuse container 10 is further provided with a pair of wheels 32, mounted on the lower portion 24 of the front wall 14. The wheels 32 also permit the refuse container 10 to be easily moved from one location to another.

The refuse container is conveniently provided with a second, pivotally disposed handle 34, mounted on the front wall 14. This handle 34, in conjunction with handle 30, permits picking up or lifting of the refuse container 10. Alternatively, the handle 34 may be used for pulling the refuse container 10 in a tipped position and balanced on its wheels 32 for easy movement from one location to another.

The lid 26 is conveniently provided with a handle means 38, for ease in handling the lid; that is, lifting the lid off the refuse container or replacing it.

The scoop portion 28 of the lid 26 is conveniently formed by providing an inner hollow portion 40 of the lid 26 defined by an upwardly rising surface 42. The upwardly rising surface 42 begins at one side and increases in the direction of the opposite side. Advantageously, the upwardly rising surface 42 begins at the side of the lid 26 associated with the front wall 14 of the refuse container 10 and increases in the direction of the side of the lid 26 associated with the rear wall 20 of the refuse container 10.

Figure 6:
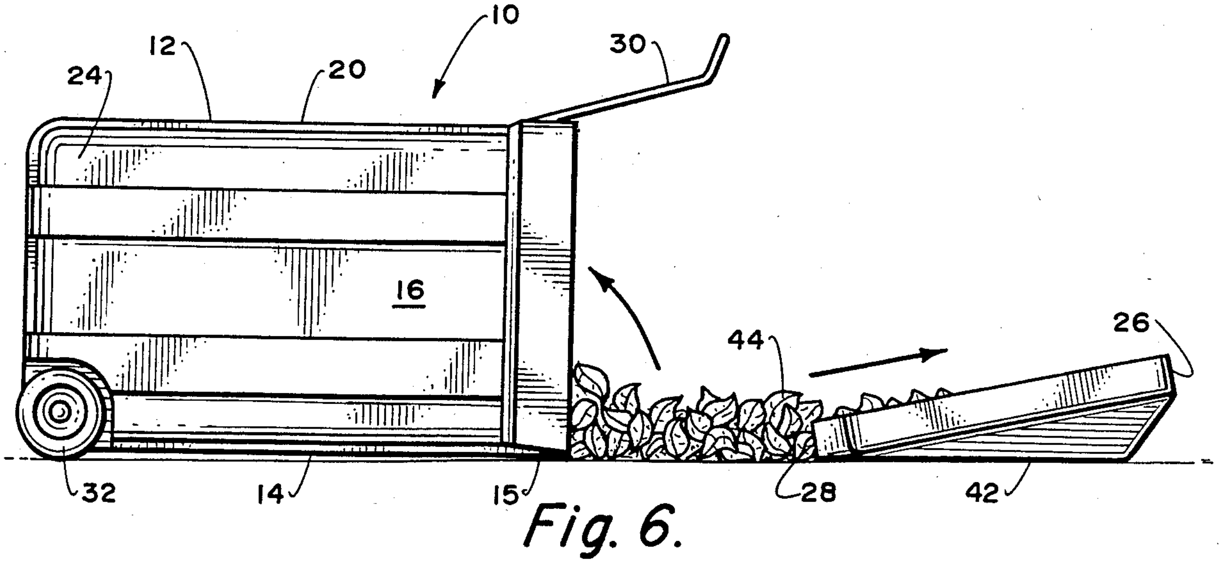
FIG. 6 is a side elevational view of the refuse container of the invention, showing the operation thereof in scooping up leaves.

The operation of the refuse container of the invention is depicted in FIG. 6. There, the refuse container 10 is shown lying on its front wall 14. Leaves 44 or other refuse are easily scooped into the refuse container 10 by the simple expedient of pulling the refuse container 10 along the ground by means of the elongated handle 30. The lip portion 15 of the front wall 14 is configured to assist in this scooping operation. A rake, broom or other implement may be employed to aid in the scooping operation. Further, the lid 26 may be used as a scoop, in the manner of a dustpan, in scooping up the leaves 44 or other refuse for assisting in depositing the refuse in the refuse container 10. When the trash is picked up in this manner, the refuse container 10 is restored to its full upright position. In that position, the now-filled trash container 10 may be pulled by handle 34, balanced on its wheels 32, and moved to an appropriate location.

Thus, a refuse container has been disclosed, provided with means for ease in scooping up leaves or other refuse. Various modifications and changes may be made without deviating from the spirit and scope of the invention, and all such modifications and changes are intended to be within the scope of the appended claims.

What is claimed is:

1. A refuse container comprising in combination:

(a) a body having a front wall, two sidewalls, and a rear wall, an open upper end and a lower portion, said front wall forming a scoop portion at its upper end;

(b) an accommodating lid, including a scoop means;

(c) an elongated pivotally disposed handle on said rear wall, adapted for pulling said refuse container while lying on its front wall.

2. The refuse container in accordance with claim 1 further provided with a pair of wheels on the lower portion of said front wall.

3. The refuse container of claim 1 further provided with a pivotally disposed handle on said front wall.

4. The refuse container of claim 1 wherein said lid is further provided with handle means.

5. The refuse container of claim 1 wherein said lid comprises an inner hollow portion defined by an upwardly rising surface, rising from one side and increasing to the opposite side.

6. A refuse container comprising in combination:

(a) a body having a front wall, two sidewalls and a rear wall, an open upper end and lower portion, said front wall forming a scoop portion at its upper end;

(b) an accommodating lid, including a scoop means, said lid comprising an inner hollow portion defined by an upwardly rising surface, rising from the side associated with said front wall and increasing to the side associated with said rear wall;

(c) an elongated, pivotally disposed handle on said rear wall, suitable for pulling said refuse container while lying on its front wall;

(d) a pair of wheels mounted on the lower portion of said front wall; and (e) a pivotally disposed handle on said front wall.

7. The refuse container of claim 6 wherein said lid is further provided with handle means.

* * * * *